United States Patent [19]
Burstyn

[11] Patent Number: 5,777,796
[45] Date of Patent: Jul. 7, 1998

[54] PENTAPRISM COMBINER/SPLITTER

[75] Inventor: Herschel Burstyn, Plainsboro, N.J.

[73] Assignee: Delta America Ltd., Fremont, Calif.

[21] Appl. No.: 686,381

[22] Filed: Jul. 25, 1996

[51] Int. Cl.[6] .............................. G02B 27/14; G02B 5/04
[52] U.S. Cl. ........................ 359/634; 359/636; 359/834
[58] Field of Search .................................. 359/634, 636, 359/831, 834

[56] References Cited

U.S. PATENT DOCUMENTS

| | | | |
|---|---|---|---|
| 1,319,292 | 10/1919 | Kunz | 359/636 |
| 1,320,625 | 11/1919 | Kunz | 359/636 |
| 2,202,257 | 5/1940 | Klaver | 359/636 |
| 2,267,948 | 12/1941 | Rantsch | 359/636 |
| 3,905,684 | 9/1975 | Cook et al. | 359/834 |
| 4,268,119 | 5/1981 | Hartmann | 359/834 |
| 4,784,469 | 11/1988 | Tsukada et al. | 359/831 |
| 4,890,899 | 1/1990 | Aoki et al. | 359/831 |
| 4,974,178 | 11/1990 | Izeki et al. | 364/523 |
| 5,097,323 | 3/1992 | Sato et al. | 358/60 |
| 5,179,658 | 1/1993 | Izawa et al. | 395/164 |
| 5,224,085 | 6/1993 | Shinkai et al. | 369/44.33 |
| 5,404,437 | 4/1995 | Nguyen | 395/152 |
| 5,448,551 | 9/1995 | Miyagawa et al. | 369/271 |
| 5,465,177 | 11/1995 | Barbier et al. | 359/636 |
| 5,619,284 | 4/1997 | Magocs | 348/757 |
| 5,664,141 | 9/1997 | Yamamuro | 711/111 |
| 5,671,202 | 9/1997 | Brownstein et al. | 369/58 |

*Primary Examiner*—Georgia Y. Epps
*Assistant Examiner*—Evelyn A. Lester
*Attorney, Agent, or Firm*—Skjerven, Morrill, MacPherson, Franklin & Friel; David W. Heid

[57] ABSTRACT

An optical engine for combining or splitting color light beams, compatible with modern high-speed projection systems, is described. The invention utilizes a unique pentaprism core element, partially bounded by five faces, two each on either side of a plane of bilateral symmetry and one opposite, bisected by the plane of bilateral symmetry. Two of the faces of the pentaprism are coated with dichroic films. Functioning as a light combiner, the pentaprism uses these dichroic surfaces and its geometry to interact with incoming tri-color light beams which, after first passing through appropriately modulated light valves, are selectively transmitted and reflected such that all beams exit, axially aligned, from one side of the pentaprism. Functioning as a light splitter, the pentaprism uses the dichroic surfaces and its geometry to split a white light beam into its component primary colors and pass these colors out of the pentaprism. Turning mirrors are used to direct the tri-color beams into or out of the pentaprism region at the necessary angles for proper operation. The turning mirrors are configured to increase compactness of the optical engine while maintaining nearly equal path lengths for all of the tri-color beams.

27 Claims, 2 Drawing Sheets

5,777,796

1

PENTAPRISM COMBINER/SPLITTER

BACKGROUND AND SUMMARY OF THE INVENTION

This invention pertains to what can be thought of as a dual-operating-mode optical engine that is capable of functioning bidirectionally both as an optical combiner and as an optical splitter respecting the relationship between so-called white light and the primary components thereof—red, green and blue light. In particular, the invention relates to a unique, compact, single-piece pentaprism element which forms the core optical component of the engine and which functionally is compatible with the high speed of modern projection systems without requiring the use of problematic high-index glass.

Conventional color combiners, for example, exist primarily in one of two forms—the ladder configuration and the so-called Phillips prism configuration. The standard ladder configuration uses dichroic elements oriented at 45-degrees to incoming light beams to achieve color combination. If the dichroic elements are implemented as dichroic films coated on plates, aberrations such as astigmatism and coma may become a problem. Also, the typical high angle of incidence between such dichroic films and impinging light beams decreases both transmission and reflection efficiency, and as a result, the combiner becomes incompatible with the brightness requirement typically specified for a high-speed projector system. Similarly, a Phillips prism system, if configured without the use of an appropriate high-index glass, is incompatible with high-speed projection systems utilizing field lenses to achieve compactness due to total internal reflection ("TIR") failure. This can be overcome through the use of high-index glass prisms, but such prisms suffer several inherent problems, such as a tendency to chip, poor transparency in the blue range, and unwanted dispersion which characterizes the performance of high-index glass.

A general object of the present invention, accordingly, is to offer a unique, compact, high-efficiency optical engine which avoids the kinds of drawbacks and difficulties just suggested above, and which offers all of the advantages that are sought in relation to sophisticated high-speed projection systems.

According to a preferred embodiment of the present invention, the engine proposed thereby employs, as its core element, a unique low-index glass pentaprism, on a pair of faces in which are coated dichroic films, combined with other optical elements that are arranged in a selected geometrical configuration which can achieve color separation/ combination without the use of TIR, and its attendant problems thereto. The body of the pentaprism element, in its interior, defines what is referred to herein as a light-modification region, alternatively called a light-integration and light-separation region, and in this region, where light beams impinge upon the two faces in the pentaprism which are dichroically coated, the angle of incidence on both sides of the faces is much lower than the typical 45°. In the embodiment specifically described and illustrated herein the angle of incidence is more in the nature of about 22½°.

The novel pentaprism element proposed according to the invention is a single-piece element, alternatively called a solid prism assembly, and by virtue of that fact, offers the important is advantage that it contains no internal optical boundaries or discontinuities which require light beam transition and the opportunity for potential problems.

Combined in the overall engine with the dichroically coated pentaprism element are plural light valves, three to be

2 specific, with one provided for each of the three primary beam colors of red, blue and green. These light valves sit in the appropriate paths for these beams, and are operable, for example under computer control, to respond to appropriate image-containing data streams that are relevant to each of these three colors.

In addition to the several important features and advantages just mentioned above, the engine proposed by this invention, cored as it is by the unique pentaprism mentioned, affords the opportunity for selective construction of an engine with different possible configurations, each of which promotes compact, efficient, and relatively low-cost construction.

Further, the use of the core, single-piece pentaprism effectively reduces to zero the requirement for tedious and painstaking optical alignments of the type which attend the set-up and use of many prior art systems.

These and other objects and advantages that are attained by the invention will become more clearly understood and apparent from a consideration of the accompanying drawings when viewed in light of the text material which now follows.

DESCRIPTION OF THE DRAWINGS

FIG. 2 illustrates the system/engine of the invention being employed as a combiner of red, blue and green light beams.

DETAILED DESCRIPTION OF PREFERRED EMBODIMENT OF THE INVENTION

Figure 1:
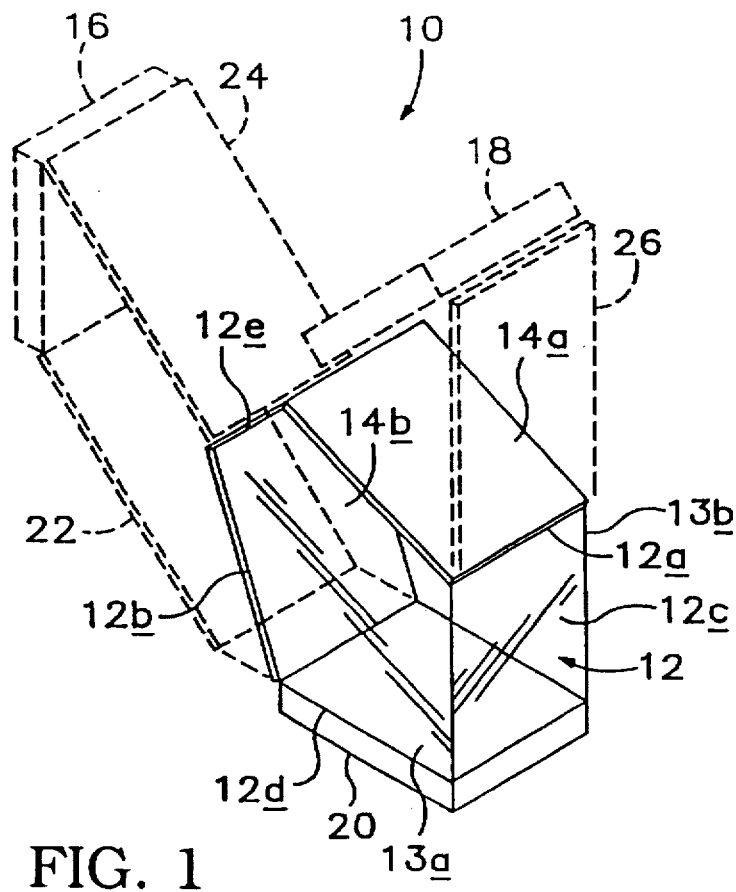
FIG. 1 is a simplified isometric view illustrating a preferred embodiment of the system in which, at the upper and left sides of this view, certain components present in the system are shown in dashed lines to afford a clearer view than might otherwise exist of what has been referred to above as the central optical pentaprism element in the system.
Figure 2:
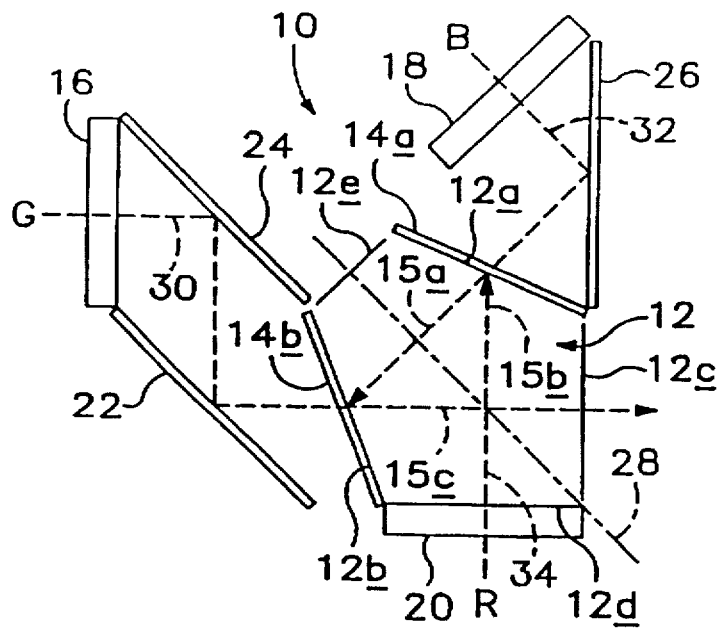
FIG. 2 is a view, on a slightly smaller scale than FIG. 1, taken generally from the lower left side of FIG. 1, with all of the main structural components in the system/engine shown in solid lines.
Figure 3:
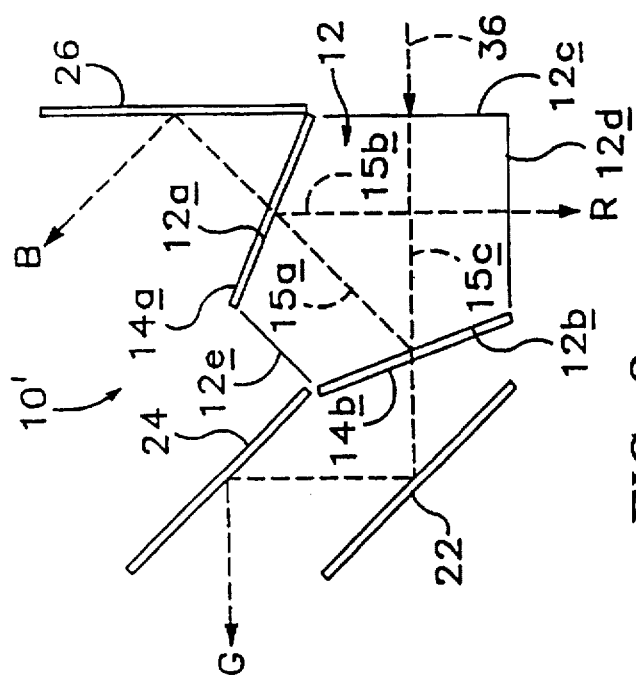
FIG. 3, which is drawn on substantially the same scale as FIG. 2, pictures the system/engine being employed as a splitter of white light into red, blue and green components.

Turning now to the drawings, and referring initially to FIGS. 1, 2 and 3 collectively, indicated generally at 10 and 10' are two versions (reverse-directionally related) of an optical system, also referred to herein as an optical engine, each of which is constructed in accordance with a preferred embodiment of the present invention. In quick summary, engines 10, 10' include, as what is referred to herein as a central element, a unique low-index glass pentaprism 12, on faces 12a and 12b in which are provided dichroic coatings 14a, 14b, respectively. These coatings are alternatively called dichroic surfaces and dichroic films, and as can be seen they are disposed at acute angles relative to one other. The dichroic surfaces function in a manner that will be described shortly.

Engine 10 further includes first, second, and third conventionally available light valves 20, 18, 16, respectfully, alternatively called optical elements, light-modulation structures and pixelating light-valve structure. No such light valves are present in engine 10'. Included in both engines 10, 10' are three conventional turning mirrors, 22, 24, 26, alternatively called reflective surfaces and reflective coatings, whose functions also will shortly be described.

Engines 10, 10' further include and define a first optical path segment 15a extending between faces 12a and 12b and normal to a plane of bilateral symmetry (that will be described shortly below) and second and third optical path segments 15b 15c, respectively, disposed at oblique angles to that same plane of bilateral symmetry. Segment 15b extends as shown between face 12a and the plane of bilateral symmetry and segment 15c extends between face 12b and the plane of bilateral symmetry. The geometrical composite of optical path segments 15a, 15b, 15c takes the form of a right triangle.

Focusing attention on FIG. 2 among these three figures, indicated by dash-dot line 28 is what has been referred to herein above as a plane of bilateral symmetry which characterizes a geometric feature of pentaprism 12. As can be seen in FIG. 2, on one side of this plane are a first and second face 12a, 12c, respectively, and on the other side are a third and fourth face 12b 12d, respectively. A fifth face 12e in the pentaprism is bisected by normally intersecting plane 28.

Another way of looking at the central pentaprism of the invention is to envision an optical plane through which the red, blue, and green light beams transmit, best thought of as the plane of FIG. 2. Then, as can be envisioned from FIG. 1, this plane would be in-between, and parallel to, spaced-apart end surfaces 13a and 13b, with faces 12a, 12b, 12c, 12d, and 12e being transverse to the optical plane. If the optical engine were being used as a combiner, for example, light would enter through three of the faces, be combined within the pentaprism, and exit a fourth face, thereby leaving a fifth face optically inoperative.

Continuing with attention focused principally on FIG. 2, let us now consider how engine 10 performs as a light combiner. Through any suitable means and organization which is not relevant to the core of the present invention, green, blue and red incoming light beams are presented, and these are shown by dashed lines 30, 32, 34, respectively. As pictured in FIG. 2, these three beams are generally coplanar and lie within the plane of FIG. 2. Green beam 30, labeled G, enters from the left side of FIG. 2, passes (when permitted) through light valve 16, is reflected 90° by mirror 24, is reflected again 90° by mirror 22 into a path which parallels its incoming path, passes through face 12b and coating 14b (at a low angle of incidence-about 22½°), and then passes directly, and straight through, the pentaprism as illustrated. In connection with this remark about passing straight through the pentaprism, one will recognize that, with the engine of the invention being used as a combiner, what emerges from the pentaprism is a combined beam, axially aligned, that includes elements drawn from all three of the incoming beams. It is noted that the green, blue and red beams traverse an isosceles triangular path within the interior region of the pentaprism. The length of a shorter side of this triangle is of length X, as indicated in FIG. 2, and represents the length of the traverse on the isosceles triangle of the green light beam.

Further with respect to the path followed by the beam of green light, measured from where the beam emerges from what can be thought of as the exit face of valve 16 (the right side of thereof is, FIG. 2) to the point along that path where it exits the pentaprism at face 12c this overall length is called the green-beam path length. An interesting feature of the present invention is that the path lengths, so defined, for all three beams, including each of the other two beams (blue and red), are substantially identical.

The beam of blue light 32, labeled B, enters angularly from the upper side of FIG. 2, passes (as permitted) through light valve 18, is reflected 90° by mirror 26, passes through coating 14a and prism face 12a (at substantially the same low angle of incidence mentioned above), is reflected and turned (at the same low angle of incidence) by dichroic coating 14b, and emerges from the side 12c of the pentaprism as a portion of the combined output beam, and along the same final portion of the path followed by the green beam. The beam of blue light may be seen to traverse two sides of the triangle described above, over a length thereon of approximately 2.4X. Reinforcing the notion that path lengths are equal, the overall blue-beam path length is measured from the point at which the beam emerges from the downstream side of valve 18 (the underside thereof in FIG. 2) to the point where the beam emerges from face 12c in FIG. 2.

Completing a description of the "combining" performance now being described in relation to FIG. 2, red beam 34, labeled R, enters from the bottom side of the figure, passes (as permitted) through light valve 20 to enter the underside of prism 12 in FIG. 2, is reflected and turned (at substantially the same low angle of incidence mentioned repeatedly above) by dichroic coating 14a, is reflected and turned again, and at the same low angle of incidence, by dichroic coating 14b, and then passes through prism face 12c to exit along the same final portions of the paths followed by the previously described green and blue beams -- thus to form the final, combined, constituent in the output combined beam. The beam of red light may be seen to traverse all three sides of the triangle described above, over a length thereon of approximately 3.4X. The overall path length followed by the red beam is defined as that length between the point at which the beam exits or emerges from the downstream side of valve 20 (its upper side in FIG. 2) to the point where it exits face 12c of prism 12.

Having thus described how engine 10 performs as an optical combiner, let us turn attention now to FIG. 3 which shows the other, reverse mode of operation where engine 10 functions as a light splitter. When engine 10' is employed in this mode, no light valves are required, and accordingly, FIG. 3 omits a showing of these valves. It does, however, contain the turning mirrors previously described. Those skilled in the art will recognize that no fresh, elaborate discussion is required to explain what really is occurring in the splitting activity pictured in FIG. 3. The white-light beam to be split enters as indicated by arrowhead 36 at face 12c of prism 12, experiences internal low-angle of incidence reflection from coating 14b (with respect to the red and blue components) while 15 passing the green component through and out of the system via turning mirrors 22, 24. The blue component passes through coating 14a to exit the system after striking turning mirror 26, and the red component exits downwardly in FIG. 3 through the prism after low-angle of incidence reflection from coating 14a. The exiting, separated light beams are alternatively called substantially monochromatic light beams.

Figure 4:
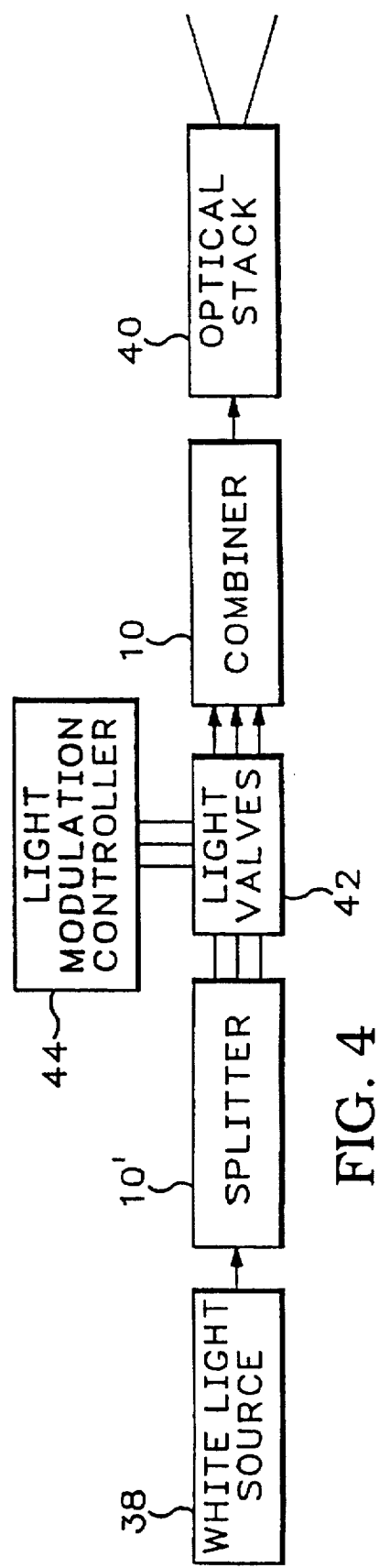
FIG. 4 is a block/schematic diagram illustrating a projector which utilizes two engines constructed in accordance with the present invention—with one functioning as a light splitter and the other functioning as a light combiner.

With attention now directed to FIG. 4, and as was mentioned above in the description of the drawings, here there is pictured in block/schematic form an overall projector which utilizes an engine 10' which performs as a splitter and an engine 10 which performs as a combiner. Progressing through this figure from the left to the right sides therein, what is here pictured in block form is a white light source 38 optically coupled to an engine 10' which is labeled "SPLITTER" and which is organized in accordance with what is pictured in FIG. 3, another engine 10 which is labeled "COMBINER" and which is constructed in accordance with the organization pictured in FIG. 2, and a conventional optical stack 40 which includes a typical projection lens that sends a projected image to the outside world.

Interposed engines 10', 10, and indicated by a block 42, are three light valves, such as previously mentioned valves, 16, 18, 20, whose operations are under the conventional control of block 44 which functions as a light modulation controller, which might typically be a computer, microprocessor or other suitable control element.

The simplicity of such a projection organization afforded by utilization of engines 10, 10' will be apparent.

Figure 5:
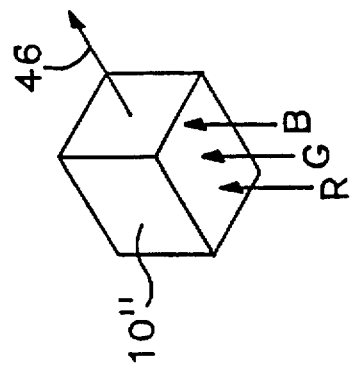
FIG. 5 is a very simplified and schematic isometric view illustrating generally a configuration of the engine/system performing as a light combiner, wherein incoming red, blue and green light beams approach the engine from the same direction along parallel axes (which might be thought of as being contained generally in one plane), with emergent, combined white light exiting orthogonally in the same plane.

FIG. 5 in the drawings illustrates in highly schematized way how an engine 10", constructed in accordance with the present invention, might be employed with suitable turning mirrors to allow for red, blue and green input beams to enter the engine along parallel axes generally directed upwardly in a common plane, and be combined to emerge generally orthogonally within the same plane as indicated at 46. Engine 10" is like engine 10 except for the necessary and different organization of is turning mirrors.

Accordingly, a preferred embodiment of the present invention has been described in organizations allowing for both modes of operation, splitting and combining, and the obvious simplicity and elegance of the high efficiency pentaprism are made evident by the description and drawings. Low-index glass or even plastic in the prism offers all of the advantages discussed earlier, and the construction and geometry of the pentaprism lead to low angles of incidence for transmission and reflection, which translates into high optical efficiency. Internal optical activity that might cause problems were there to be internal optical discontinuities in the prism are avoided, inasmuch as the prism is a single-piece unit. That is not to say, however, that the pentaprism can't successfully be implemented as a system of dichroic films mounted on transmissive plates arranged in empty space. Since the angles of incidence and reflection are low (about 22½°) it is possible to construct a combiner/splitter which has relatively low polarization sensitivity (i.e., the band edges of the dichroic layers don't shift when there is a change made from S polarization to P polarization). Thus, the proposed structure can be used with a polarizing cube in conjunction, if desired, with reflective light valves.

While several organizations of the engine have been disclosed with turning mirrors specifically illustrated in certain locations, it will be apparent to those skilled in the art that other specific turning-mirror organizations, such as the one alluded to for engine 10", can be used to take advantage of the engines capabilities and to afford opportunities for the construction of systems having different footprints and configurations. For example, the organization shown in FIG. 5, and under a circumstance where the entering red, blue and green beams enter engine 10" upwardly and substantially vertically, a system obviously is constructable which can be thought of as having a high vertical aspect ratio and a relatively tiny footprint. Also, an alternative embodiment might include the use of solid prism assemblies with external reflective coatings instead of turning mirrors.

Thus, while a preferred embodiment and certain suggested modifications of the invention have been illustrated and described herein, other variations and modifications that come to the minds of those skilled in the art are appreciated and will clearly come within the scope of the claims covering the present invention.

It is claimed and desired to secure by Letters Patent:

1. An optical device for processing light beams, the device comprising:

a first optical interface, wherein the first optical interface is configured to transmit light beams of a first color and to reflect light beams not of the first color;

a first light beam structure having a first end and a second end, the second end of the first light beam structure being operatively coupled to the first optical interface, wherein the first light beam structure is configured to guide a substantially monochrome light beam of the first color in a path intersecting the first optical interface, wherein the substantially monochrome light beam of the first color is transmitted through the first optical interface;

a second optical interface, wherein the second optical interface is configured to transmit light beam of a second color and to reflect light beams of not of the second color;

a second light beam structure having a first end and a second end, the second end of the second light beam structure being operatively coupled to the second optical interface, wherein the second light beam structure is configured to guide a substantially monochrome light beam of the second color in a path intersecting the second optical interface, wherein the substantially monochrome light beam of the second color is transmitted through the second optical interface; and a third optical interface, wherein the third optical interface is configured to transmit light beams of a third color and to reflect light beams not of the third color, wherein the first, second and third optical interfaces are disposed to define three faces of a pentaprism so that a first optical path between a fourth face of the pentaprism and the first end of the first light beam structure has a number of reflections equal to a number of reflections of a second optical path between the fourth face of the pentaprism and the first end of the second light beam structure.

2. The optical device of claim 1 wherein the first optical path has two reflections.

3. The optical device of claim 1 wherein the first, second and third optical interfaces are disposed so that a third optical path between the third optical interface and the fourth face of the pentaprism has a number of reflections substantially equal to the number of reflections in the first optical path.

4. The optical device of claim 3 wherein the first, second and third optical paths have a substantially equal number of transmissions through dichroic layers.

5. The optical device of claim 1 wherein the first light beam structure comprises a pair of substantially parallel reflective surfaces.

6. The optical device of claim 5 wherein the pair of substantially parallel reflective surfaces are disposed so that a light beam of the first color traveling along the first optical path is reflected twice within the first light beam structure and transmitted through the first optical interface.

7. The optical device of claim 6 wherein the first optical path has a segment without reflection within the pentaprism between the first optical interface and the fourth face of the pentaprism.

8. The optical device of claim 1 wherein the second light beam structure comprises a reflective surface disposed so that a light beam of the second color traveling along the second optical path is reflected once within the second light beam structure and transmitted through the second optical interface.

9. The optical device of claim 8 wherein the second optical path has a first segment within the pentaprism between the second optical interface and the first optical interface and has a second segment within the pentaprism substantially equivalent to the segment within the pentaprism of the first optical path.

10. The optical device of claim 8 wherein the second optical path includes a reflection within the pentaprism off of the first optical interface.

11. The optical device of claim 1 wherein the third optical path includes two reflections within the pentaprism.

12. The optical device of claim 11 wherein the third optical path includes a reflection off of the first optical interface and a reflection off of the second optical interface.

13. The optical device of claim 11 wherein the third optical path includes:

a first segment between the third optical interface and the second optical interface;

a second segment between the second optical interface and the first optical interface; and a third segment between the first optical interface and the fourth face of the pentaprism.

14. An optical device for processing light beams, the device comprising:

first optical means for transmitting light beams of a first color and to reflect light beams not of the first color;

first reflecting means for directing a substantially monochrome light beam of the first color in a path intersecting the first optical means, wherein the substantially monochrome light beam of the first color is transmitted through the first optical means;

second optical means for transmitting light beams of a second color and to reflect light beams of not of the second color;

second reflecting means for directing a substantially monochrome light beam of the second color in a path intersecting the second optical means, wherein the substantially monochrome light beam of the second color is transmitted through the second optical means; and third optical means for transmitting light beams of a third color and to reflect light beams not of the third color, wherein the first, second and third optical means are disposed to define three faces of a pentaprism so that a first optical path between a fourth face of the pentaprism and a first end of the first reflecting means has a number of reflections equal to a number of reflections of a second optical path between the fourth face of the pentaprism and a first end of the second reflecting means.

15. The optical device of claim 14 wherein the first optical path has two reflections.

16. The optical device of claim 14 wherein the first, second and third optical means are disposed so that a third optical path between the third optical means and the fourth face of the pentaprism has a number of reflections substantially equal to the number of reflections in the first optical path.

17. The optical device of claim 16 wherein the first, second and third optical paths have a substantially equal number of transmissions through dichroic layers.

18. The optical device of claim 14 wherein the first reflecting means comprises a pair of substantially parallel reflective surfaces.

19. The optical device of claim 18 wherein the pair of substantially parallel reflective surfaces are disposed so that a light beam of the first color traveling along the first optical path is reflected twice within the first reflecting means and transmitted through the first optical means.

20. The optical device of claim 19 wherein the first optical path has a segment without reflection within the pentaprism between the first optical means and the fourth face of the pentaprism.

21. The optical device of claim 14 wherein the second reflecting means comprises a reflective surface disposed so that a light beam of the second color traveling along the second optical path is reflected once within the second reflecting means and transmitted through the second optical means.

22. The optical device of claim 21 wherein the second optical path has a first segment within the pentaprism between the second optical means and the first optical means and has a second segment within the pentaprism substantially equivalent to the segment within the pentaprism of the first optical path.

23. The optical device of claim 21 wherein the second optical path includes a reflection within the pentaprism off of the first optical means.

24. The optical device of claim 14 wherein the third optical path includes two reflections within the pentaprism.

25. The optical device of claim 24 wherein the third optical path includes a reflection off of the first optical means and a reflection off of the second optical means.

26. The optical device of claim 24 wherein the third optical path includes:

a first segment between the third optical means and the second optical means;

a second segment between the second optical means and the first optical means; and a third segment between the first optical means and the fourth face of the pentaprism.

27. A method of combining light beams, the method comprising:

directing a light beam of a first color to a first dichroic interface along a first optical path;

directing a light beam of a second color to a second dichroic interface along a second optical path; and directing a light beam of a third color to a third dichroic interface along a third optical path, wherein the first, second and third optical paths have substantially equal numbers of reflections and substantially equal numbers of transmissions through dichroic interfaces and wherein the first, second and third dichroic interfaces form three faces of a pentaprism.

* * * * *